United States Patent [19]

Jackson et al.

[11] Patent Number: 4,847,635

[45] Date of Patent: Jul. 11, 1989

[54] LARGE COPY SHEET FEEDING SYSTEM

[75] Inventors: Richard W. Jackson, Barrington; A. J. Michaelis, Glen Ellyn, both of Ill.

[73] Assignee: AM International, Inc., Chicago, Ill.

[21] Appl. No.: 85,813

[22] Filed: Aug. 13, 1987

[51] Int. Cl.[4] .............................................. G01D 15/24

[52] U.S. Cl. ..................................... 346/136; 271/256

[58] Field of Search ......................... 346/136, 79, 134; 271/258, 256, 207, 3.1; 400/613, 613.1, 512

[56] References Cited

U.S. PATENT DOCUMENTS 4,165,029 8/1979 Mitchell ............................. 346/136

*Primary Examiner*—E. A. Goldberg
*Assistant Examiner*—Huan Tran
*Attorney, Agent, or Firm*—Nicholas A. Camasto; John R. Hoffman

[57] ABSTRACT

A feed system for large copy sheets to feed such sheets through a copying machine, such as a white print, blue print or other copying machine, a computer printing machine, a pen plotter of other vector plötter, or raster plotter, or a printing machine. A supply roll is provided with copy sheets wound on the supply roll in an interleaved or overlapping array. A pair of support rollers form a cradle for freely supporting the supply roll, with at least one of the support rollers being driven. A printing roller grasps a copy sheet as the sheet is fed from the supply roll. A sensor stops the driven support roller and, in turn, the supply roll at a given time in a predetermined cycle whereby the printing roller can pull the fed sheet away from the supply roll and away from a succeeding overlapped sheet interleaved with the fed sheet.

14 Claims, 2 Drawing Sheets

LARGE COPY SHEET FEEDING SYSTEM

FIELD OF THE INVENTION

This invention generally relates to copying, duplicating, printing or plotting systems and, particularly, to a feed system for feeding large copy sheets through a copying, duplicating, printing or plotting machine.

BACKGROUND OF THE INVENTION

It is widely known to provide various continuous and/or automatic feeding systems for copy sheets through copying or duplicating machines. Most such feed systems normally have been designed for relatively small copy sheets and often rely upon the inherent thickness of the sheets to facilitate the positioning, stacking and feeding function. For instance, the inherent thickness of relatively small copy sheets often is used to advantage in transporting the sheets and deflecting the sheets into various positions for copying.

Devices of the character described are not applicable for use with whiteprint, blueprint or similar copying machines which handle relatively large copy sheets. An example of such a copier is a machine which uses the diazo process where a translucent original is placed upon a relatively large sheet of sensitized diazo coated media and the two sheets are fed together through the machine. The sheets are carried around a transparent cylinder which contains an ultraviolet lamp. Wherever the light passes through the original to the copy, the sensitized coating on the copy is decomposed leaving the copy media white. Wherever the image on the original shields the copy media from the light, the sensitized coating will remain as a latent image. After being separated from the original, the exposed copy media passes into a developer station where a thin film of activator is applied. The activator combines with the coating in the latent image area and forms a visible image on the copy material. The copy then emerges from the machine as a flat, dry print ready for immediate use. This is but one type of copying machine to which the present invention is applicable, in that the size of the copy sheets may be as large as 24×36 inches or 36×48 inches. Other duplicating, printing or plotting machines have similar applicability.

Such copying machines as the diazo process machines exemplify a definite need for an improved feed system for large copy sheets through copying machines. As exemplified above, considerable time is expended by an operator in loading the machine with individual copy sheets. In the case of a diazo-type machine, the operator actually must feed both the original and the copy media, whereafter the sheets must be manually removed as they are running through and being discharged from the machine. It is readily apparent that manual handling of large copy sheets not only is a cumbersome process but also quite time consuming and labor intensive.

Another problem in handling large size copy sheets is in the area of storage. Conventionally, the copy sheets are stored in flat condition, sometimes in large drawer-like cabinets. Inventories of various sizes of large copy sheets present space problems.

Efforts to automate the feeding procedure of large copy sheets, for the most part, have centered around the use of a flat cassette-type storage unit and feed mechanism, similar to a standard office-type copier. However, such efforts do not solve the inventory/storage problems. In addition, loading and reloading such cassettes are extremely difficult, and the weight alone of such cassettes with large copy sheets limits their use to strong individuals. In addition, knives or shears to cut continuous wound roll media are sometimes used but add considerable manufactured cost and size to the machine as well as noise and service costs.

This invention is directed to solving the above problems and satisfying the need of a new feed system for large copy sheets. The invention has wide applications and is not limited to such machines as those using the diazo process since the concepts of the invention are equally applicable to any type of copying, duplicating, printing or plotting machine using large copy sheets.

SUMMARY OF THE INVENTION

Accordingly, an object of the invention is to provide a new and improved feed system for large copy sheets through a whiteprint, blueprint or similar copying machines. The invention also is applicable for use with a computer printing machine, a pen plotter or other vector plotter, raster plotter, or a printing machine.

In the exemplary embodiment of the invention, a supply roll of large copy sheets is provided, with the sheets laid onto the roll in an interleaved or overlapping array, but not limited to one method of laying sheets on a roll. Means are provided for driving the supply roll. Printer roller means are provided for grasping a copy sheet as the sheet is fed from the supply roll. Sensing means stop the driving means and, in turn, the supply roll at a given time in a predetermined cycle whereby the printing roller means can pull the fed sheet away from the supply roll and away from the succeeding overlapped sheet interleaved with the fed sheet.

As disclosed herein, the driving means include a pair of support rollers which form a cradle for supporting the supply roll, with at least one of the support rollers being driven. At least one of the support rollers may be spring-loaded to accommodate a decreasing diameter of the supply roll as sheets are removed from the supply roll during copying.

In the preferred embodiment of the invention, the printing roller is continuously driven during intermittent stopping of the supply roll. The sensing means preferably are located adjacent the printing roller for sensing a lead edge of a copy sheet fed from the supply roll.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
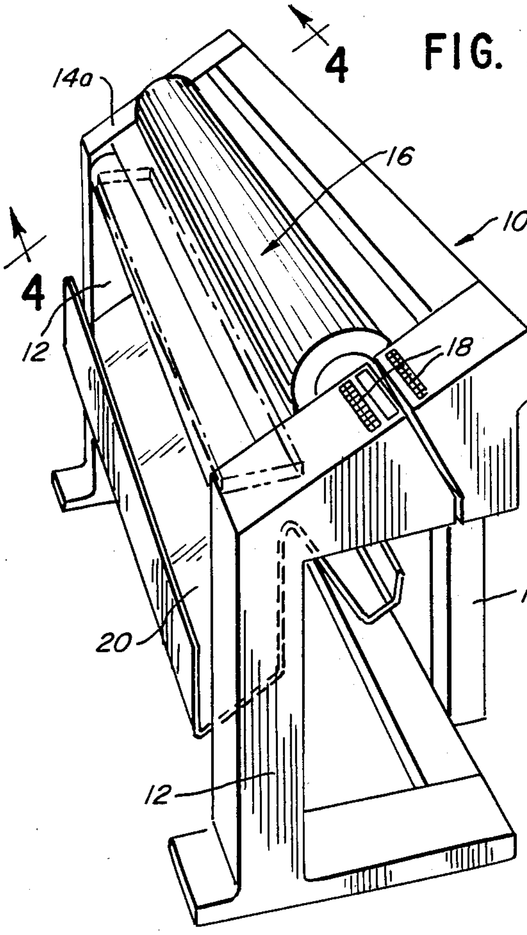
FIG. 1 is a perspective view of a copying machine applicable for incorporating the feed system of the invention.

Referring to the drawings in greater detail, and first to FIG. 1, a copying machine, generally designated 10, is broadly shown to include pedestals 12 for supporting left and right side housing portions 14*a* and 14*b* between which a supply roll, generally designated 16, of large copy sheets is disposed. Appropriate controls, with an exposed control panel 18, are housed within right housing portion 14*b*. Drive mechanisms, as described hereinafter, for the feed system are housed in left housing portion 14*a*. A stacking tray 20 is disposed beneath the upper portion of the machine, between pedestals 12, for receiving and stacking the large copy sheets discharged from the bottom of the imaging section of the machine after copying.

Figure 2:
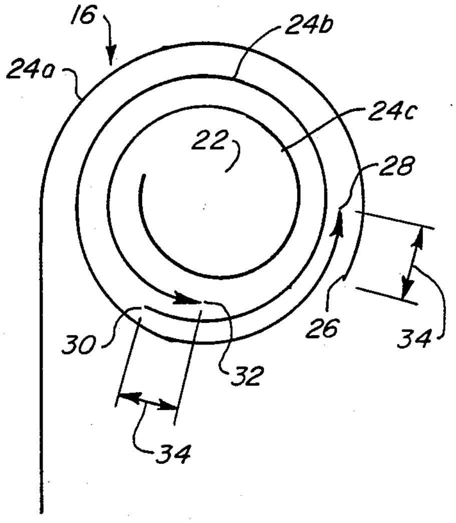
FIG. 2 is a schematic illustration of the interleaved or overlapped array of copy sheets on the supply roll.
Figure 3:
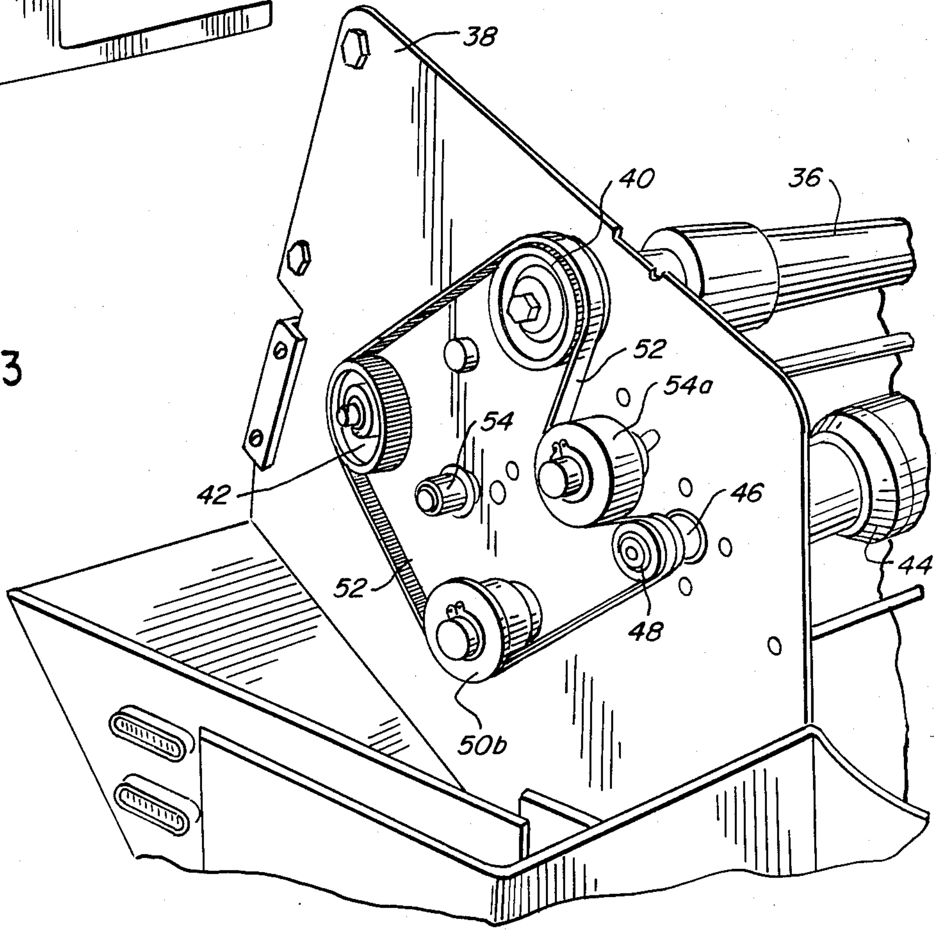
FIG. 3 is a perspective view, on an enlarged scale, of internal components of the machine for driving the support rollers for the supply roll.

FIG. 2 shows a schematic illustration of supply roll 16 which comprises a plurality of large copy sheets wound on the roll about a disposable core 22. Although the supply roll would include a relatively large number of sheets, FIG. 3 shows only three copy sheets 24*a*,24*b* and 24*c* which are wound onto the supply roll in an interleaved or overlapping array. In other words, a trailing edge 26 of copy sheet 24*a* is overlapping the leading edge 28 of copy sheet 24*b*. Similarly, a trailing edge 30 of copy sheet 24*b* is overlapping the leading edge 32 of copy sheet 24*c*. This interleaved or overlapping array of copy sheets continue throughout the entire thickness of copy sheets wound on core 22 of supply roll 16. The amount of overlap between the sheets is illustrated by double-headed arrows 34. The amount or degree to which the sheets are overlapped could depend on various factors such as the weight of the copy paper or material, the size of the copy sheets, the composition and frictional properties of the copy sheets or other factors. The interleaved array of the copy sheets is provided for ease of winding and holding the copy sheets onto the supply roll and to prevent a succeeding copy sheet from moving off of the supply roll until the preceding copy sheet has been fed into the machine. Otherwise, jamming problems could occur.

Means are provided driving supply roll 16 for feeding the copy sheet seriatim into the copying machine. Referring to FIG. 3, the supply roll is supported on a pair of support rollers, only one support roller 36 being visible in FIG. 3. The other support roller will be described hereinafter. The two support rollers form a cradle for freely supporting the supply roll by engagement with the outer periphery of the interleaved copy sheets. Each support roller extends through a frame plate 38 of the machine and is axially fixed with a driven pulley on the opposite side of the frame plate. Specifically, support roller 36 is drivingly integrated with a driven pulley 40, and the other support roller is drivingly integrated with a driven pulley 42. A motor 44 has a drive shaft 46 extending through frame plate 38 and is drivingly connected to a drive pulley 48. A pair of idler pulleys 50*a*,50*b* are journalled on frame plate 38, whereby a continuous drive belt 52 is wrapped around drive pulley 48, driven pulleys 40 and 42, and idler pulleys 50*a*,50*b*. Therefore, operation of motor 44 is effective to rotate the support rollers which cradle copy sheet supply roll 16. A gear train also could be used to connect and drive support roller 36.

FIG. 3 also shows a drive gear 54 extending through frame plate 38 for connection to an appropriate second drive motor which is not shown to avoid cluttering the illustration of the drive means for the supply roll supporting rollers. Suffice it to say, the second motor is effective to rotate a printing roller, described hereinafter.

Figure 4:
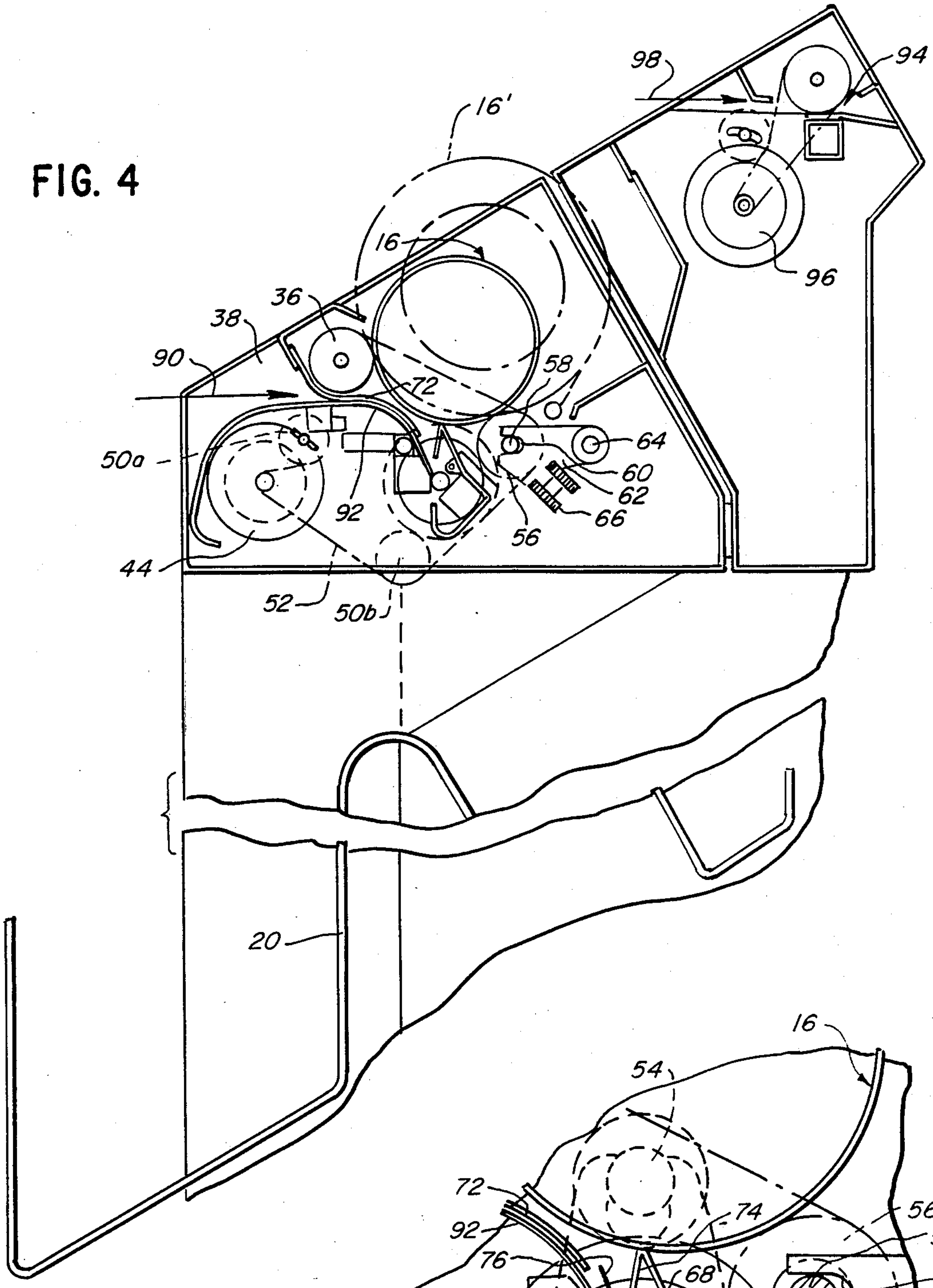
FIG. 4 is a fragmented vertical section, on an enlarged scale, taken generally along line 4—4 in FIG. 1.
Figure 5:
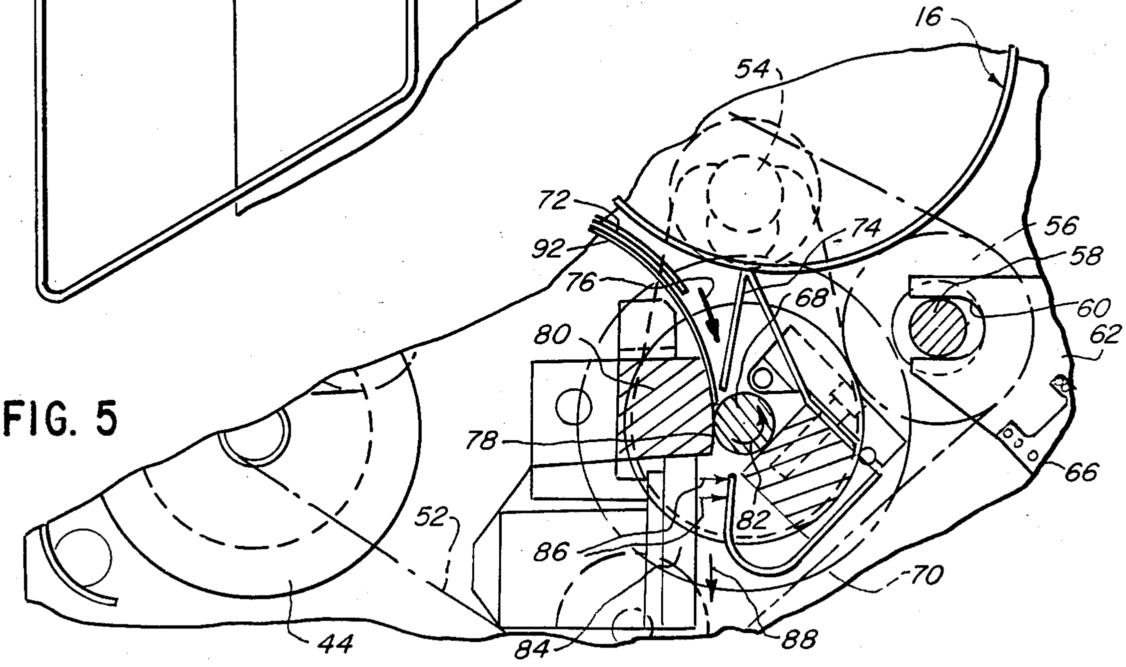
FIG. 5 is a fragmented portion of the mechanism illustrated in FIG. 4, on an enlarged scale to facilitate the illustration.

Referring to FIGS. 4 and 5, a second support roller 56 is shown in conjunction with the previously described support roller 36, whereby it can be seen that these two driven support rollers 36,56 form a cradle for supporting supply roll 16. The locations of motor 44, idler pulley 50*a*, idler pulley 50*b* and drive belt 52 also are visible in FIG. 4, although some of those components are shown in phantom since they are disposed on the opposite side of frame plate 38 (i.e. the side shown in FIG. 3).

FIG. 4 also shows that second support roller 56 is mounted by a shft 58 disposed in a lost motion slot 60 of a lever arm 62 pivoted, at 64, to frame plate 38. This allows for movement of the support roller under the biasing of a coil spring 66 in order to maintain driving contact with supply roll 16 as sheets are fed off of the supply roll. In other words, the decreasing diameter of the supply roll is accommodated as sheets are removed from the supply roll during copying. For instance, an "original" or full supply roll is shown in phantom and generally designated 16'. As the original supply roll 16' decreases in diameter to the size shown by the reference numeral 16, the weight of the supply roll also decreases and spring 66 is effective to move support roller 56 upwardly and thereby maintains the lower periphery of the supply roll in substantially the same proximity to the sheet guiding and printing mechanisms of the system, described below.

More particularly, referring to the enlarged depiction of FIG. 5 in conjunction with FIG. 4, a printing roller 68 is journalled on the machine between side housings 14*a*,14*b* (FIG. 1) and is drivingly integrated with drive gear 54 (FIG. 3) so that the printing roller can be drivingly rotated by a print drive motor 70 shown in phantom in FIG. 5. A copy sheet is fed from supply roll 16 between a curved guide plate 72 and a stripper guide plate 74 downwardly in the direction of arrow 76 between printing roller 68 and a Teflon-coated surface 78 of a sensor 80. Printing roller 68 is rotated by motor 70 in the direction of arrow 82 to drive the copy sheet downwardly between a printing device such as an ink jet 84. The ink jets are illustrated by arrows 86 which are effective to print onto the copy sheet as the copy sheet moves in the direction of arrow 88. After copying, the sheet proceeds downwardly into stacking tray 20. It can be seen that sensor 80 is located adjacent printing roller 68 which drives the copy sheet past printing device 84 (i.e. ink jets 86). This is advantageous because the sensor thereby can sense a lead edge of a copy sheet fed from the supply roll immediately preceding the printing device. Therefore, the sensor can be coupled by any appropriate lead means to the printing device to start the printing device only when a copy sheet approaches the device. In addition, sensor 80 may be of various known devices, such as a photosensor or a simple mechanical arm which can be deflected by the leading edge of a copy sheet to energize a microswitch or the like. Regardless, the sensor is coupled by any appropriate lead lines to motor 44 which drives support rollers 36 and 56 for supply roll 16.

In operation, the machine is started by actuating the appropriate controls on control panel 18 (FIG. 1) to energize motors 44 and 70, motor 44 rotating support rollers 36 and 56, and motor 70 rotating printing roller 68. When a lead edge of a copy sheet is sensed by sensor 80, the sensor is effective to stop motor 44 and stop rotation of support rollers 36 and 56. This stops supply roll 16, while printing roller 68 continues to rotate and to pull the copy sheet off and away from the supply roll as well as away from a succeeding overlapped sheet interleaved on the supply roll with the sheet being fed through the machine. Of course, depending upon the size of the sheets on the supply roll, the friction between the sheets or the other factors described above, a simple time delay may be incorporated in the line between sensor 80 and motor 44 in order to allow the printing roller to easily pull the fed sheet out of its overlapped relationship with the succeeding interleaved sheet on the supply roll. The time delay simply would be set depending upon the size of the sheets on the supply roll. It can be seen that the machine is applicable to provide continuous feeding of the sheets through the machine whereby printing roller 68 continues to rotate and sensor 80 is effective to intermittently stop support rollers 36,56 and, in turn, supply roll 16.

Originals can be fed through the machine in a variety of fashions depending upon the printing system involved. For instance, in a diazo process whereby the original and a copy sheet are fed through the machine simultaneously, the original may be fed into the machine in the direction of arrow 90 (FIG. 4) between curved guide plate 72 and a juxtaposed guide plate 92. Furthermore, the machine may be equipped with a scanner device, generally designated 94 (FIG. 4) driven by a scanner drive motor 96. Originals simply would be fed to the scanner in the direction of arrow 98. Regardless of the system of feeding originals through the copying machine, the novel feeding system of this invention, incorporating a supply roll of copy sheets in an overlapped or interleaved array, is an effective system which totally eliminates the cumbersome and time consuming handling of large copy sheets as with prior systems. It can be seen that the problems of storage and handling of large copy sheets, including attempts to move large sheets in flat cassettes, are eliminated by the interleaved supply roll system of the invention. The invention provides pre-cut sheets of media laid on a roll for convenient handling and dispensing as single sheets through a copying, duplicating, printing or plotting machine. It can also be seen that the expense, size and service problems of a cutting shear are eliminated.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A feed system for large copy sheets through a copying machine, comprising:

a supply roll of said copy sheets in an interleaved array;

means for rotating said supply roll;

grasping means for grasping a copy sheet as the sheet is fed from the supply roll; and sensing means for sensing a position of the fed sheet and stopping the rotating means and, in turn, the supply roll at a given time in a predetermined cycle whereby the grasping means can pull the fed sheet away from the supply roll and away from a succeeding overlapping sheet interleaved with the fed sheet.

2. The feed system of claim 1 wherein said rotating means include a pair of support rollers which form a cradle for supporting the supply roll, at least one of said support rollers being driven.

3. The feed system of claim 2 wherein at least one of said support rollers is spring loaded to accommodate a decreasing diameter of the supply roll as sheets are removed from the supply roll during copying.

4. The feed system of claim 1, including means for continuously driving said grasping means during intermittent stopping of the supply roll.

5. The feed system of claim 1 wherein said sensing means are located adjacent a printing roller means for sensing a lead edge of a copy sheet fed from the supply roll.

6. A continuous feed system for large copy sheets through a copying machine, comprising:

a supply roll of said copy sheets in an interleaved array;

first motor means for rotating said supply roll;

grasping means for grasping a copy sheet as the sheet is fed from the supply roll;

second motor means for continuously driving said grasping means during copying; and sensing means for sensing a position of the fed sheet and stopping the first motor means and, in turn, the supply roll at a given time in a predetermined cycle whereby the grasping means can continuously pull copy sheets away from the supply roll during intermittent stopping of the supply roll.

7. The feed system of claim 6, including a pair of support rollers which form a cradle for supporting the supply roll, at least one of said support rollers being driven by said first motor means.

8. The feed system of claim 7 wherein at least one of said support rollers is spring loaded to accommodate a decreasing diameter of the supply roll as sheets are removed from the supply roll during copying.

9. The feed system of claim 6 wherein said sensing means are located adjacent a printing roller means for sensing a lead edge of a copy sheet fed from the supply roll.

10. In a copying machine for large copy sheets, a feed system which includes a supply roll of said copy sheets in an interleaved array whereby a copy sheet can be fed away from the supply roll and away from a succeeding overlapped sheet interleaved with the fed sheet, and means for feeding the copy sheets from the supply roll.

11. In a copying machine as set forth in claim 10, including a pair of support rollers which form a cradle freely supporting the supply roll.

12. In a copying machine as set forth in claim 11, including means for driving at least one of said support rollers.

13. The feed system of claim 12 wherein at least one of said support rollers is spring loaded to accommodate a decreasing diameter of the supply roll as sheets are removed from the supply roll during copying.

14. In a copying machine as set forth in claim 12, including sensing means for sensing a position of a fed sheet and for stopping the driving means and, in turn, the supply roll whereby the fed sheet can be pulled from the supply roll.

* * * * *